(12) United States Patent
Vantu et al.

(10) Patent No.: US 8,169,196 B2
(45) Date of Patent: May 1, 2012

(54) CHARGING DEVICE

(75) Inventors: Florin Vantu, Malmö (SE); Ulf Liedholm, Kristianstad (SE); Alexander Ambrus, Ramlösa (SE)

(73) Assignee: Sony Mobile Communications AB, Lund (SE)

( * ) Notice: Subject to any disclaimer, the term of this patent is extended or adjusted under 35 U.S.C. 154(b) by 536 days.

(21) Appl. No.: 11/839,111

(22) Filed: Aug. 15, 2007

(65) Prior Publication Data

US 2009/0001938 A1   Jan. 1, 2009

Related U.S. Application Data

(60) Provisional application No. 60/946,574, filed on Jun. 27, 2007.

(51) Int. Cl.
*H02J 7/04* (2006.01)
*H02J 7/16* (2006.01)

(52) U.S. Cl. .................. 320/165; 320/112; 320/114

(58) Field of Classification Search .............. 320/165, 320/107, 112, 114
See application file for complete search history.

(56) References Cited

U.S. PATENT DOCUMENTS

| | | | | |
|---|---|---|---|---|
| 5,672,953 A * | 9/1997 | Kim | | 320/163 |
| 5,903,131 A * | 5/1999 | Sekine et al. | | 320/106 |
| 5,963,012 A * | 10/1999 | Garcia et al. | | 320/106 |
| 6,339,314 B1 | 1/2002 | Bruning | | |
| 6,822,425 B2 * | 11/2004 | Krieger et al. | | 320/139 |
| 6,833,685 B2 * | 12/2004 | Howard et al. | | 320/128 |
| 2002/0004385 A1 * | 1/2002 | Yamamoto et al. | | 455/417 |
| 2002/0053895 A1 | 5/2002 | Simoes et al. | | |
| 2002/0074970 A1 * | 6/2002 | Kawashima | | 320/107 |
| 2003/0155889 A1 | 8/2003 | Howard et al. | | |
| 2004/0164711 A1 * | 8/2004 | Hayashi | | 320/134 |
| 2004/0257037 A1 * | 12/2004 | Hartung et al. | | 320/114 |
| 2005/0258800 A1 * | 11/2005 | Aradachi et al. | | 320/107 |
| 2006/0181241 A1 * | 8/2006 | Veselic | | 320/107 |

FOREIGN PATENT DOCUMENTS

DE   199 55 985 A1   5/2001

OTHER PUBLICATIONS

Machine translation of DE19955985.*
International Search Report and Written Opinion dated May 19, 2008 issued in corresponding PCT application No. PCT/IB2007/055310, 12 pages.

* cited by examiner

*Primary Examiner* — Edward Tso
*Assistant Examiner* — Samuel Berhanu
(74) *Attorney, Agent, or Firm* — Snyder, Clark, Lesch & Chung, LLP

(57) ABSTRACT

A method performed by a charging device may include detecting a presence of an external device connected to a secondary side of the charging device and setting a switch on a primary side of the charging device to an off state when a presence of an external device is not detected.

13 Claims, 7 Drawing Sheets

CHARGING DEVICE

RELATED APPLICATION

This application claims priority under 35 U.S.C. § 119 based on U.S. Provisional Application Ser. No. 60/946,574, filed Jun. 27, 2007, the disclosure of which is incorporated herein by reference.

TECHNICAL FIELD OF THE INVENTION

The invention relates generally to charging devices and, more particularly, to switching on/off states of a charging device.

DESCRIPTION OF RELATED ART

Charging devices conventionally include a primary side that receives power via an alternating current (AC) outlet and a secondary side that is connected to an external device that receives power. Charging devices commonly remain plugged into AC wall outlets when no external device is present. Even if no external device is connected to the charger, or if charging is completed, a small amount of power is still consumed by the primary side of the charger as it continues to draw current from the AC outlet. At the present time, there is no adequate solution to effectively shut off all power consumption by a charging device while the charging device is not actively charging an external device.

SUMMARY

According to one aspect, a method performed by a charging device comprises detecting a presence of an external device connected to a secondary side of the charging device; and setting a switch on a primary side of the charging device to an off state when a presence of an external device is not detected.

Additionally, the detecting a presence of an external device connected to a secondary side of the charging device may further comprise detecting that an external device is not present when an amount of electrical current being drawn is less than a predetermined value.

Additionally, the detecting a presence of an external device connected to a secondary side of the charging device may further comprise detecting that an external device is not present when an output connection switch is in an off state.

Additionally, the detecting a presence of an external device connected to a secondary side of the charging device may further comprise detecting that an external device is not present using a proximity detector.

Additionally, when the switch on a primary side of the charging device is set to an off state the charging device consumes no power.

Additionally, the method may further comprise detecting both a control voltage and polarity of the external device connected to the charging device; and in response to the detected control voltage and polarity of the external device, controlling and powering switching logic to an on state.

Additionally, the method may further comprise detecting when both the charging device is reconnected to an AC voltage and when the external device was previously connected to the charging device; and in response to the detecting, controlling and powering switching logic to an on state.

Additionally, the method may further comprise charging the external device using a switching logic in an on state; and providing the switching logic to consume no power while in the on state.

According to another aspect, a charging device is provided. The charging device may comprise an alternating current (AC) to (DC) converter, wherein the AC to DC converter includes a primary side that receives power from an AC power source and a secondary side that provides power to an external device; and a switch connected between the AC power source and the AC to DC converter; switching logic configured to: determine at least on of whether an external device is presently connected to the charging device or an external device connected to the charging device is fully charged; and send a control signal to the switch to set the switch to an off state when the switching logic determines that no external device is presently connected to the charging device or the external device is fully charged.

Additionally, the switching logic determines that the external device is fully charged when less than a predetermined amount of current is being drawn by the charging device.

Additionally, the charging device may further comprise a switch configured to transmit a signal indicating that the external device is presently connected to the charging device.

Additionally, the charging device may further comprise a proximity sensor configured to transmit a signal indicating that the external device is presently connected to the charging device.

Additionally, the switching logic may be further configured to determine that the external device is presently connected to the charging device based on monitoring at least one of voltage or current signals.

According to another aspect, a charging device may comprises a connector to receive at least one of a cord or an external device; an AC to DC converter, wherein the AC to DC converter includes a primary side that receives power from an AC power source and a secondary side that delivers power to the external device via the connector; a switch connected between the AC power source and the AC to DC converter; and an actuator extending from the connector to the switch, wherein the actuator mechanically sets the switch to an on state when at least one of a cord or an external device is plugged into or received into the connector.

Additionally, the actuator mechanically sets the switch to an off state when at least one of a cord or an external device is not plugged into or received into the connector.

Additionally, the charging device may further comprise a spring configured to provide a force against the actuator to mechanically set the switch to the off state.

Additionally, the AC to DC converter does not draw any power from the AC power source when the switch is in the off state.

According to another aspect, a charging device may comprise means for detecting a presence of at least one of an external device or cord connected to a secondary side of the charging device; and means for setting a switch on a primary side of the charging device to an off state when a presence of the at least one of an external device or cord is not detected.

Additionally, the means for detecting a presence of at least one of an external device or cord detects at least one of current or voltage.

Additionally, the means for detecting a presence of at least one of an external device or cord comprises a switch.

Additionally, the switch is activated by at least one of the external device, the cord or an actuator.

Additionally, the means for detecting a presence of at least one of an external device or cord comprises a proximity detector.

Additionally, charging device may further comprise means for detecting whether the external device is fully charged by comparing at least one of a current or voltage signal to a threshold value.

Other features and advantages of the embodiments will become readily apparent to those skilled in this art from the following detailed description. The embodiments shown and described provide illustration of the best mode contemplated for carrying out the embodiments. Accordingly, the drawings are to be regarded as illustrative in nature, and not as restrictive.

BRIEF DESCRIPTION OF THE DRAWINGS

Reference is made to the attached drawings, wherein elements having the same reference number designation may represent like elements throughout.

DETAILED DESCRIPTION

The following detailed description of the invention refers to the accompanying drawings. The same reference numbers in different drawings identify the same or similar elements. Also, the following detailed description does not limit the embodiments. Instead, the scope of the embodiments is defined by the appended claims and equivalents.

Figure 1A:
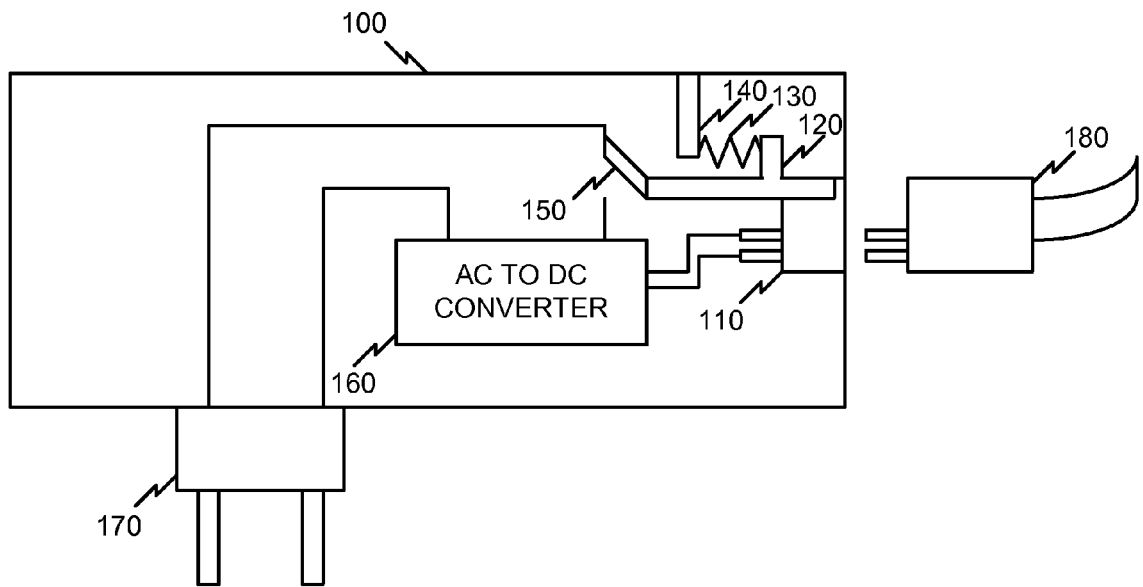
FIGS. 1A-1B illustrate one embodiment of an exemplary charging device.

FIG. 1A is a diagram of an exemplary charging device 100 in which methods and systems consistent with the embodiments may be implemented. Charging device 100 may include a connector 110, an actuator 120, a spring 130, an abutment 140, a switch 150, an alternating current (AC) to direct current (DC) converter 160 and an AC plug 170. Connector 110 may receive cord 180 from an external device (not shown) that may be charged by charging device 100. Charging device 100 may be formed of a plastic housing in which all the components described below may be mounted.

Connector 110 may include an opening or port within charging device 100 that may receive a connection cord for an external device. In other embodiments, connector 110 may include an opening or port to receive an external device. Connector 110 may include electrical connection devices used to electrically connect an external device cord and/or an external device to AC to DC converter 160 within charging device 100.

Figure 1B:
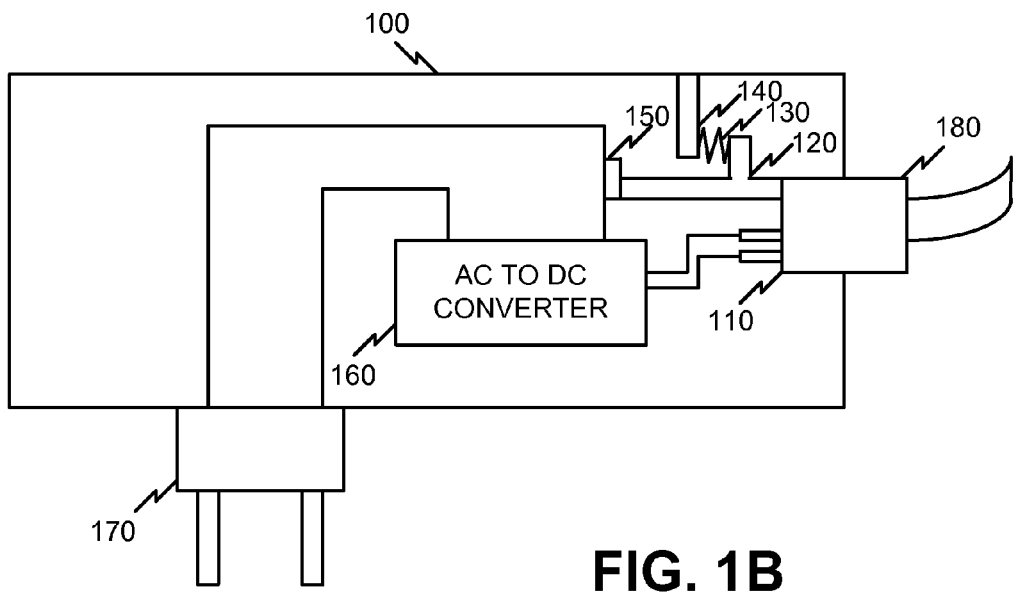

Actuator 120 may include a mechanical actuator or mechanical linkage that extends from connector 110 to switch 150. Spring 130 provides a force against abutment 140 to keep one end of actuator 120 in connector 110 (as shown in FIG. 1A). When a cord 180 (or external device) is placed into connector 110 (as shown in FIG. 1B), it comes into contact with actuator 120, causing actuator 120 to close switch 150. It should be understood that elements 120-140 may be replaced by other mechanical, electrical or electromechanical elements in order to form a connection between switch 150 and connector 110.

Switch 150 may include a mechanical switch that may be opened and closed by actuator 120. When closed, switch 150 may provide AC power to a primary side of AC to DC converter 160. When switch 150 is open, no current or power is consumed by charging device 100.

AC to DC converter 160 may include devices that convert received AC signals and power to DC signals and power. For example, AC to DC converter 160 may include diode rectifier circuits, transformers and other electronic devices used to convert and change the amplitude of electrical signals. AC to DC converter 160 may receive AC power from an AC plug 170 to a primary side (of AC to DC converter) and output DC power on a secondary side to an external device connected to connector 110.

AC plug 170 may include a power cord and plug that may be plugged into an AC outlet, such as an AC wall outlet. AC signals may be provided via AC plug 170 to a primary side of AC to DC converter 160.

Cord 180 may include a cord or cable used by an external device that may contain a rechargeable battery. An external device may include for example, a cellular radiotelephone, a personal digital assistant (PDA), a conventional laptop and/or palmtop receiver or any other portable device, such as an MP3 player, a video game playing device, etc.

As shown in FIGS. 1A-1B, when cord 180 (or external device, mobile phone, etc.) is placed into or plugged into connector 110, switch 150 is closed and charging device 100 may charge the external device. When no cord 180 or external device is present, switch 150 may remain open and therefore no power will be consumed by charging device 100.

Figure 2:
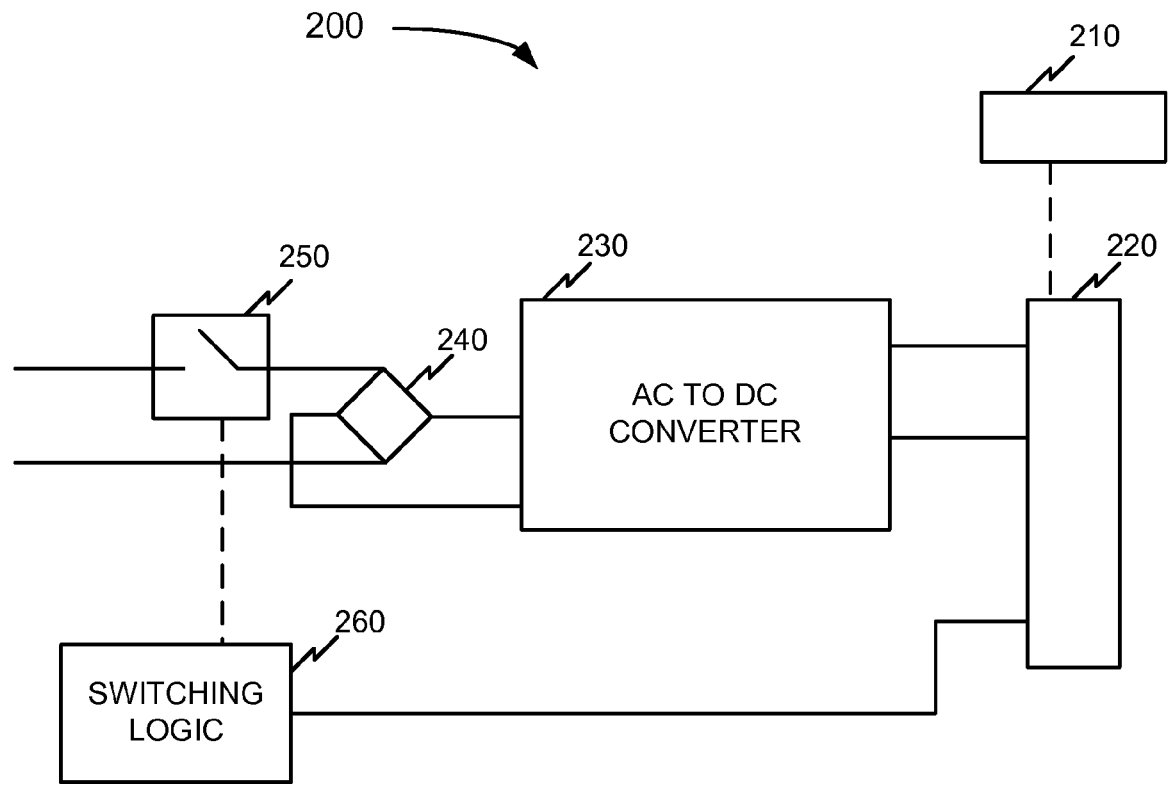
FIG. 2 is a diagram of another embodiment of an exemplary charging device.

FIG. 2 is a diagram of another exemplary embodiment of a charging device 200. Charging device 200 may include a connector 210, an electronic connector 220, an AC to DC converter 230, a rectifier 240, a primary switch 250 and switching logic 260. One skilled in the art would recognize that charging device 200 may be configured in a number of other ways and may include other or different elements, such as for example, fuses, and/or other components that convert AC power to DC power, etc.

Connector 210 may include an opening within charging device 200 or any connection device that may receive a connection cord for an external device and/or may receive an external device. For example, connector 210 may be a physical port (similar to connector 110 as shown in FIG. 1A) within charging device 200.

Electronic connector 220 may include electrical connection devices used to electrically connect an external device cord and/or an external device that may be physically connected to charging device 200 via connector 210. Specifically, electronic connector 220 may electrically connect an external device to a secondary side of AC to DC converter 230 in order to receive power from charging device 200. Electronic connector 220 may be included in connector 210 and may include electrical contacts and/or wires that provide power from charging device 200 to the external device.

AC to DC converter 230 may include devices that convert received AC signals and power to DC signals and power. For example, AC to DC converter 230 may include transformers and other electronic devices used to convert and change the amplitude of electrical signals. AC to DC converter 230 may receive AC power from a primary side (via rectifiers 240) and output DC power on a secondary side to an external device connected via electrical connector 220.

Rectifier 240 may include a diode circuit that receives AC signals and outputs DC signals to AC to DC converter 230. In other embodiments, rectifier 240 may be contained in AC to DC converter 230.

Primary switch 250 may include an electrical/mechanical switch, such as a relay or any other type of switch that may receive an electrical control signal and perform or produce a mechanical switching operation. For example, primary switch 250 may receive a control signal from switching logic 260 that may control primary switch 250 to be in a conducting "on state," or in an open circuit, non-conducting "off state."

Switching logic 260 may include logic that monitors and/or receives signals from electronic connector 220 and may control primary switch 250 based on the signals from electronic connector 220. For example, logic contained in switching logic 260 may include transistor logic, or a combination of hardware and software, etc. Switching logic 260 may monitor and/or receive voltage and/or current signals from electronic connector 220 that may indicate if an external device is present. For example, switching logic 260 may be programmed to store a minimum current threshold that may be used to determine whether an external device is present and/or charging. Assume for example, the minimum current threshold is 50 milliamperes (mA). In this case, if switching logic 260 detects a current greater than 50 mA being drawn from AC to DC converter 230 via the signals from electronic connector 220, switching logic 260 may determine that an external device is currently present and charging. If, for example, switching logic 260 monitors a current less than 50 mA via the signals from electronic connector 220, which may indicate that an external device is fully charged or that no external device is connected, switching logic 260 may send a control signal to primary switch 250 to switch the primary switch 250 to an off state. Switching logic 260 may also sense voltage signals that may be used to determine the presence of an externally connected device. For example, if a sensed voltage is above a predetermined threshold, (e.g., such as voltage from a battery included in the external device) switching logic 260 may determine the presence of an externally connected device. Further, switching logic 260 may use a combination of monitored current and voltage signals to determine if an external device is connected, fully charged, or not connected. Once switching logic 260 sends a control signal to set primary switch 250 to an off state, no current and/or power is consumed by charging device 200, as the open circuit formed by primary switch 250 does not allow power to be consumed on the primary side of AC to DC converter 230.

The normal operation mode of switching logic 260 (when not powered or connected to another device) is a conductive "on mode." When input (as no external charging device is present or charging current is less than a threshold value or charging longer than a predetermined time period) or reconnected to the main AC power supply (after having been disconnected), switching logic 260 will switch to a conductive on mode. Switching logic 260 may use a combination of monitored polarity and/or voltage signals (of an external device, such as for example a mobile phone) to remain in, or switch to, an on mode. For example, logic within switching logic 260 may detect when both the charging device 200 is reconnected to an AC voltage and/or when an external device was previously connected to charging device 200, and in response to this detecting, controlling and powering switching logic 260 to an on state. In normal operation, switching logic 260 may remain in an on mode and consume no power.

Figure 3:
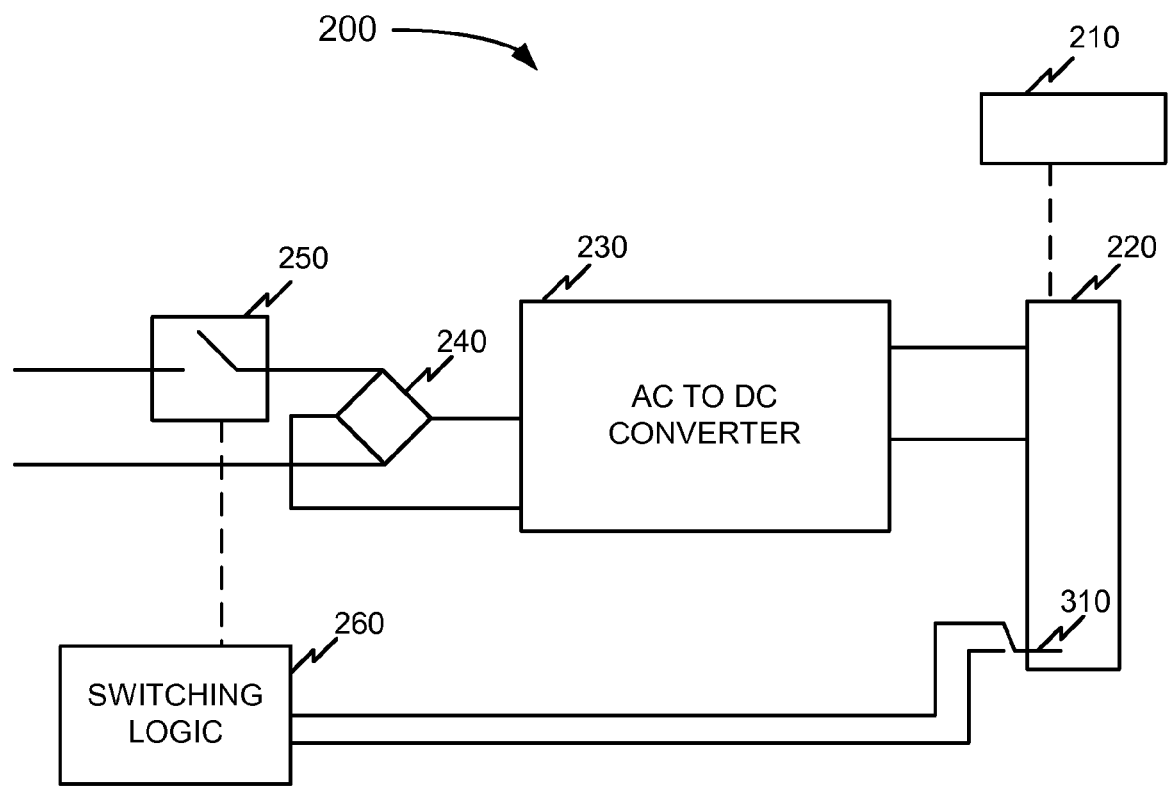
FIG. 3 is a diagram of another embodiment of an exemplary charging device.

FIG. 3 is a diagram of another exemplary embodiment of a charging device 200. As shown, this exemplary embodiment of charging device 200 may include a connector 210, an electronic connector 220, an AC to DC converter 230, a rectifier 240 and a primary switch 250 that function as described above with reference to FIG. 2. The exemplary embodiment shown in FIG. 3 further includes switching logic 260 and connector switch 310.

Connector switch 310 may include any type of switch that may be closed when an external device is received and/or connected to electronic connector 220. For example, connector switch 310 may include any type of switch located within connector 210 and/or electronic connector 220. Connector switch 310 may also be located external to connector 210 and/or electronic connector 220 with an actuator extending from connector 210 and/or electronic connector 220 to connector switch 310. When an external device is connected to charging device 200, connector switch 310 may close and send a signal to switching logic 260.

In this exemplary embodiment, switching logic 260 may include logic that monitors and/or receives signals from connector switch 310 and may control primary switch 250 based on the signals from connector switch 310. For example, switching logic 260 may receive a signal from connector switch 310 that may indicate whether an external device is present. If, for example, switching logic 260 receives a signal from connector switch 310 indicating the detection of an external device, switching logic 260 may determine that an external device is currently present and charging. If, for example, switching logic 260 does not receive a signal from connector switch 310, switching logic 260 may send a control signal to primary switch 250 to set the primary switch 250 to an off state. In this manner, switching logic 260 may control primary switch 250 based on the detected presence of an external device and thereby conserve power if no external device is detected.

Figure 4:
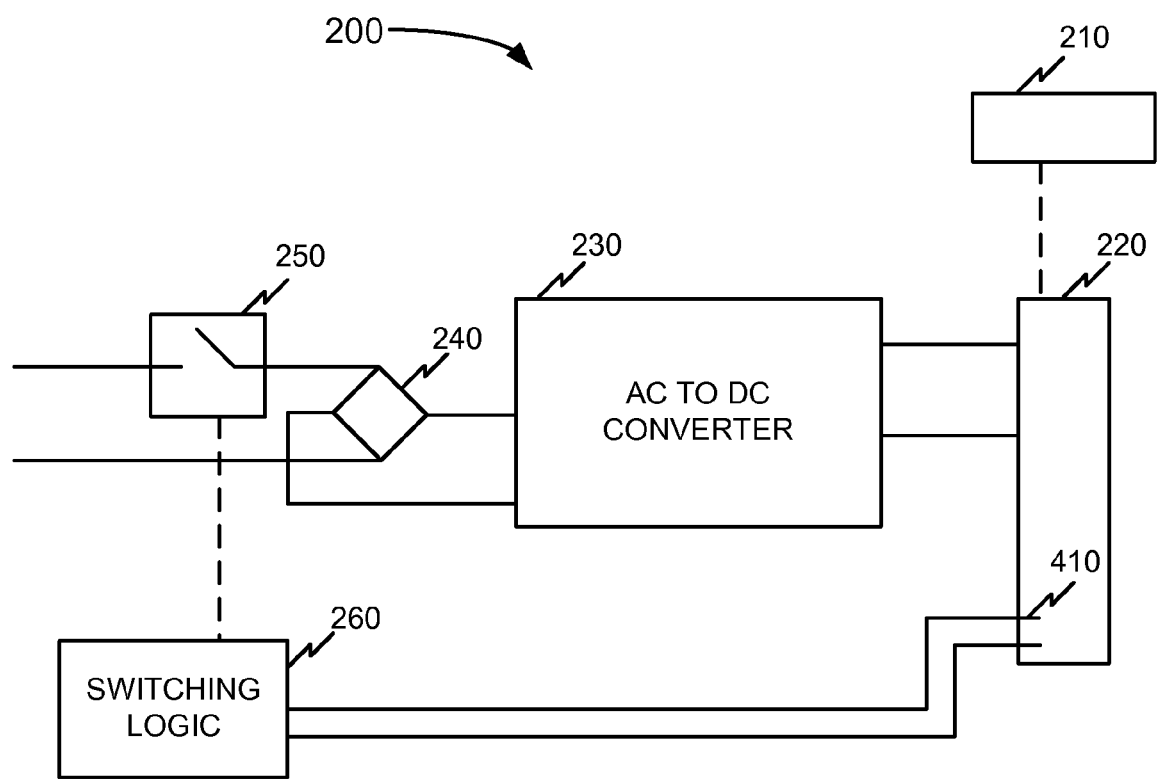
FIG. 4 is a diagram of another embodiment of an exemplary charging device.

FIG. 4 is a diagram of another exemplary embodiment of a charging device 200. As shown, this exemplary embodiment of charging device 200 may include a connector 210, an electronic connector 220, an AC to DC converter 230, a rectifier 240 and a primary switch 250 that function as described above with reference to FIG. 2. The exemplary embodiment shown in FIG. 4 further includes switching logic 260 and connector leads 410.

Connector leads 410 may include any type of electrical connection leads or wires used to establish an electrical connection. For example, connector leads 410 may include wires or leads that extend into connector 210 and/or electronic connector 220. When an external device is placed into or plugged into connector 210 and/or electronic connector 220, a circuit may be closed due to an electrical connection being made using the external device. For example, an external device may include a metallic portion, that when inserted into charging device 200, closes an electrical circuit connected to switching logic 260.

In this exemplary embodiment, switching logic 260 may include logic that monitors and/or receives signals from connector leads 410 and may control primary switch 250 based on the signals from connector leads 410. For example, switching logic 260 may detect that a closed circuit is formed with connector leads 410 that may indicate if an external device is present. If, for example, switching logic 260 monitors signals from connector leads 410 indicating a closed circuit, switching logic 260 may determine that an external device is currently present and charging. If, for example, switching logic 260 does not receive a signal from connector leads 410 (i.e., open circuit), switching logic 260 may send a control signal to primary switch 250 to set the primary switch 250 to an off state. In this manner, switching logic 260 may control primary switch 250 based on the detected presence of an external device and thereby conserve power if no external device is detected.

Figure 5:
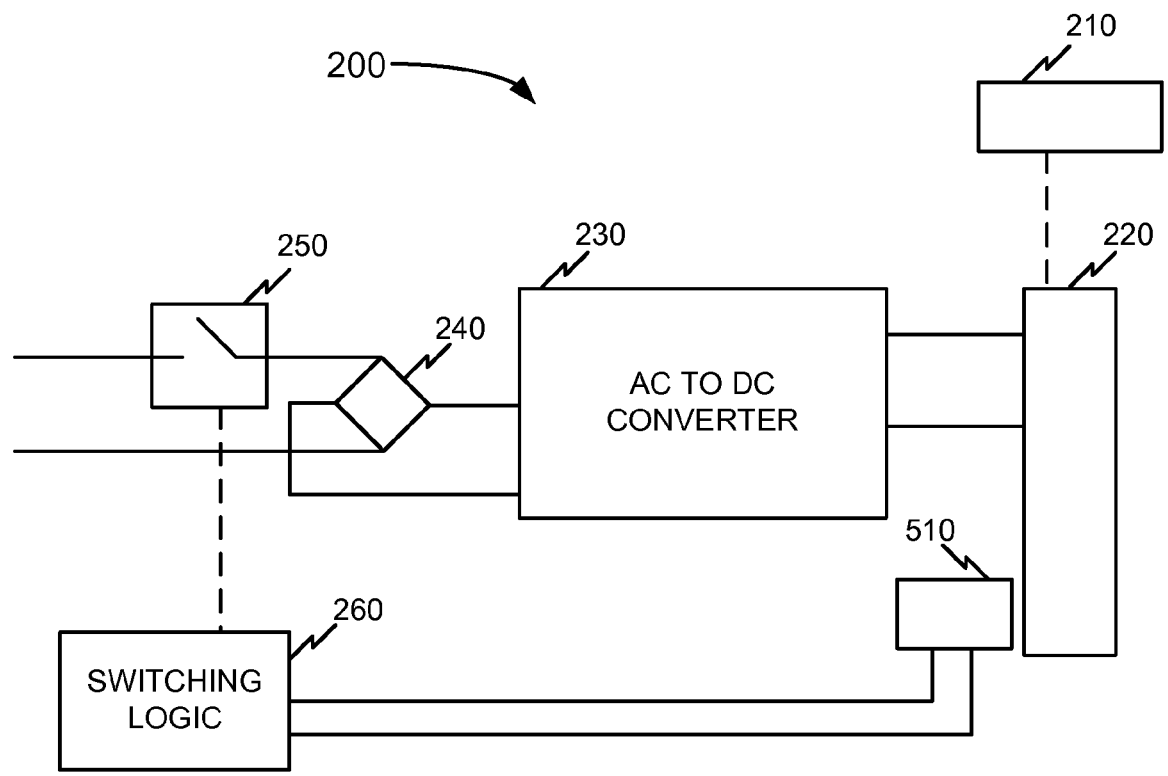
FIG. 5 is a diagram of another embodiment of an exemplary charging device.

FIG. 5 is a diagram of another exemplary embodiment of a charging device 200. As shown, this exemplary embodiment of charging device 200 may include a connector 210, an electronic connector 220, an AC to DC converter 230, a rectifier 240 and a primary switch 250 that function as described above with respect to FIG. 2. This exemplary embodiment shown in FIG. 5 further includes switching logic 260 and a proximity detector 510.

Proximity detector 510 may include any type of device that may sense the presence of an external device connected to charging device 200 without establishing an electrical connection to the detected external device. For example, proximity detector 510 may include a Hall sensor or another type of sensor capable of detecting electric or magnetic fields (that may be produced by an external device). Proximity detector 510 may also sense changes in inductance or capacitance. Upon detection of an electric or magnetic field, etc., proximity detector 510 may send a signal to switching logic 260.

In this exemplary embodiment, switching logic 260 may include logic that monitors and/or receives signals from proximity detector 510 and may control primary switch 250 based on the signals from proximity detector 510. For example, switching logic 260 may receive a signal from proximity detector 510 that may indicate that an external device is present. If, for example, switching logic 260 receives a signal from proximity detector 510 indicating the detection of an electric or magnetic field, or sense a change in inductance or capacitance, switching logic 260 may determine that an external device is currently present and charging. If, for example, switching logic 260 does not receive a signal from proximity detector 510, switching logic 260 may send a control signal to primary switch 250 to set the primary switch 250 to an off state. In this manner, switching logic 260 may control primary switch 250 based on the detected presence of an external device and thereby conserve power if no external device is detected.

Figure 6:
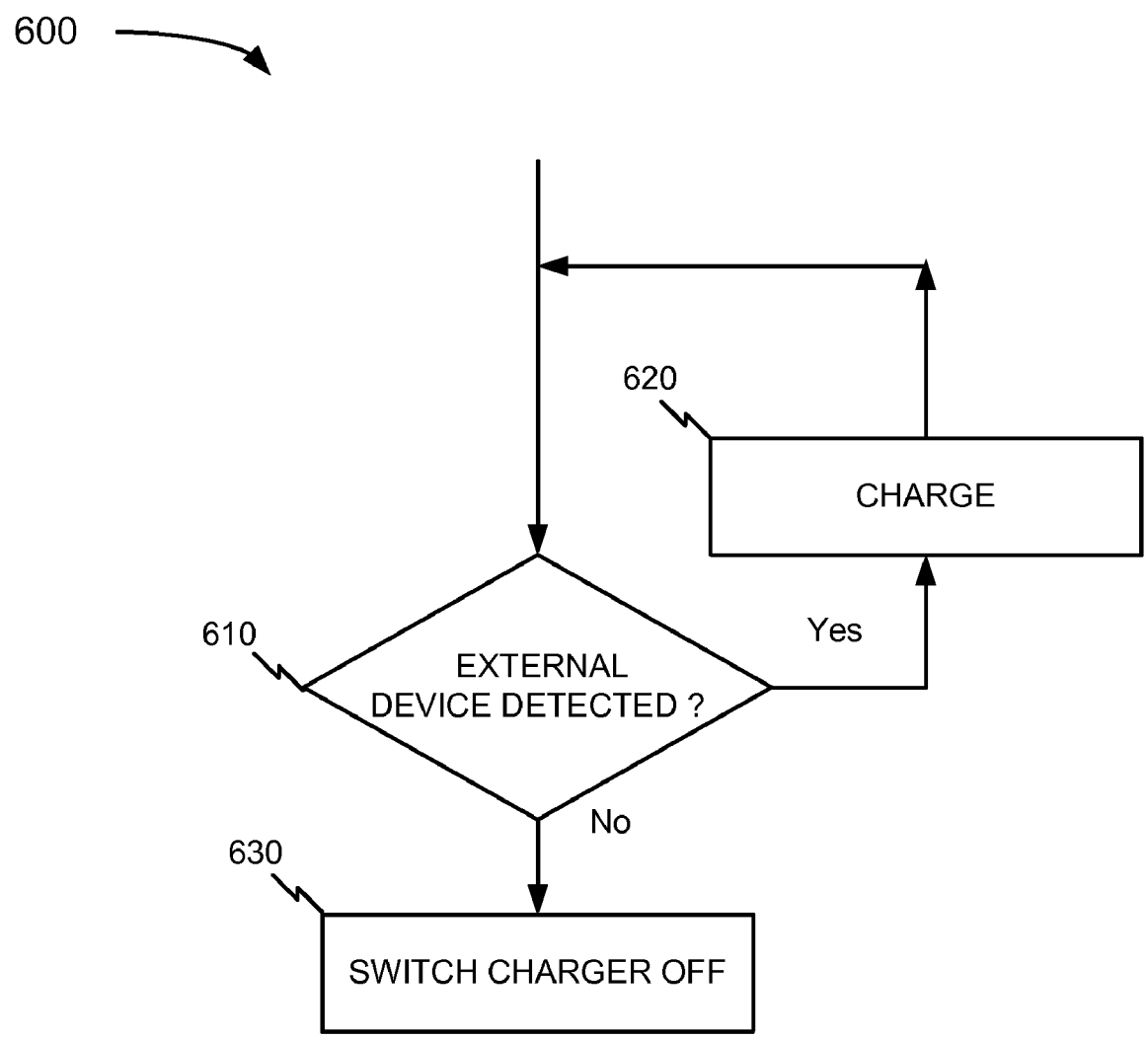
FIG. 6 is a flow diagram illustrating exemplary processing by the exemplary charging devices.

FIG. 6 is a flow diagram illustrating exemplary processing 600 that may be performed by the exemplary embodiments of the charging devices described above. Processing may begin (or continue) when a charging device (such as 100 or 200) detects that an external device is present (Yes-block 610). For example, switching logic 260 as shown in FIG. 2 may detect that a current of more than 50 mA is being drawn from AC to DC converter 230, which may indicate that an external device is present and/or charging (Yes—block 610). In other examples, switching logic 260 as shown in FIGS. 3-4, may detect that either connector switch 310 or connector leads 410, form a closed circuit. Switching logic 260 may then determine or detect that an external device is present (Yes-block 610). Similarly, proximity detector 510 may send a signal to switching logic 260, whereby switching logic 260 determines that an external device is present (Yes-block 610). In still further examples as shown in FIG. 1, actuator 120 may close switch 150 when an external device or cord 180 is received into connector 110 (Yes-block 610).

In all of the above examples, when an external device is detected or an external device that is currently charging is detected (Yes-block 610), charging (an external device) may continue (block 620). For example, in the embodiments shown in FIGS. 2-5, when an external device and/or charging is detected (using any of the methods or systems described above) primary switch 250 may remain closed, AC power may be received by AC to DC converter 230 and converted to DC, and DC power may be supplied to an external device (block 620). Regarding FIG. 1, actuator 120 may keep switch 150 closed (while cord 180 or an external device is present) so that charging may continue (block 620).

If an external device is not detected or a current below a threshold is detected (No—block 610) the charging device (e.g., charging device 100 or 200) may be switched off (block 630). For example, switching logic 260 as shown in FIG. 2, may detect a current of less than 50 mA, which may indicate that an external device is not present and/or not charging. In this case, a signal may be sent from switching logic 260 to set primary switch 250 to an off state. In other examples, switching logic 260 as shown in FIGS. 3-4, may detect that either connector switch 310 or connector leads 410, form an open circuit. In these case switching logic 260 may then determine or detect that an external device is not present based on the open circuit. In this example, a signal may be sent from switching logic 260 to set primary switch 250 to an off state. Regarding FIG. 5, proximity detector 510 may not send a signal to switching logic 260, when no external device is detected, whereby switching logic 260 may determine that an external device is not present. Based on the lack of a signal from proximity detector 510, switching logic 260 may send a signal to set primary switch 250 to an off state. As a result of setting primary switch 250 to an off state, no current and/or power may be consumed by charging device 200. In still further examples as shown in FIG. 1, actuator 120 may be forced by spring 130 to open switch 150 when an external device or cord 180 is not currently connected to charging device 100. As a result of opening switch 150, no current and/or power may be consumed by charging device 100. In this manner, the embodiments described above stop power consumption when external devices are not connected to charging device (e.g., charging device 100 or 200).

Figure 7:
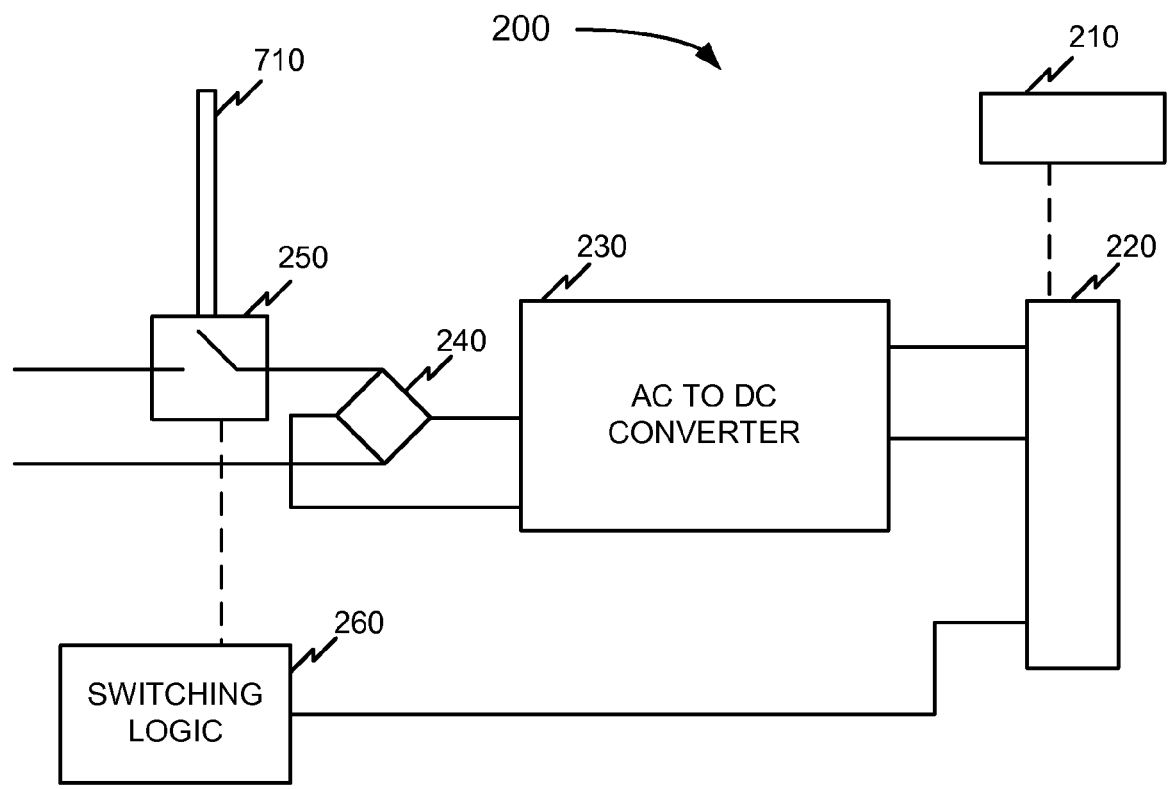
FIG. 7 is a diagram of another embodiment of an exemplary charging device.

FIG. 7 is a diagram of another exemplary embodiment of a charging device 200. As shown, this exemplary embodiment of charging device 200 may include a connector 210, an electronic connector 220, an AC to DC converter 230, a rectifier 240 and a primary switch 250 that function as described above with reference to FIG. 2. The exemplary embodiment shown in FIG. 7 further includes switching logic 260 and reset switch 710.

Reset switch 710 may include any type of switch that may cause primary switch 250 to close when a user depresses a button. For example, reset switch 710 may include a mechanical switch that may close primary switch 250 when depressed.

In this exemplary embodiment, as described above with reference to FIG. 2, switching logic 260 may include logic that monitors and/or receives signals from electronic connector 220 and may control primary switch 250 based on the signals from electronic connector 220. For example, switching logic 260 may monitor current or voltage signals from electronic connector 220 and may determine whether an external device is present. If, for example, switching logic 260 monitors current or voltage signals from electronic connector 220 and determines that an external device is not present and/or charging, switching logic 260 may send a control signal to primary switch 250 to set the primary switch 250 to an off state. In this exemplary embodiment, using reset switch 710, a user may set primary switch 250 back to an "on state" by depressing reset switch 710. In this manner, reset switch 710 may control primary switch 250 based on a user's desire to reset charging device 200 to an actively charging "on state."

Conclusion

Implementations consistent with the embodiments allow for a charging device to electrically and/or mechanically sense when no external device is connected to a secondary side of the charging device or when charging is complete and to automatically set a switch on a primary side to an off state. As a result, no power is consumed if an external device is not present and/or charging.

The foregoing description of the embodiments provides illustration and description, but is not intended to be exhaustive or to limit the embodiments to the precise form disclosed. Modifications and variations are possible in light of the above teachings or may be acquired from practice of the embodiments.

Further, while series of acts have been described with respect to FIG. 6, the order of the acts may be varied in other implementations consistent with the embodiments. Moreover, non-dependent acts may be performed in parallel.

It will also be apparent to one of ordinary skill in the art that aspects of the embodiments, as described above, may be implemented in software code or specialized control hardware used to implement aspects consistent with the principles of the embodiments. Thus, the operation and behavior of the aspects were described without reference to the specific software code—it being understood that one of ordinary skill in the art would be able to design software and control hardware to implement the aspects based on the description herein.

Further, certain portions of the embodiments may be implemented as "logic" that performs one or more functions. This logic may include hardware, such as a processor, a microprocessor, an application specific integrated circuit or a field programmable gate array, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the embodiments unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method performed by a charging device, the method comprising:
    monitoring a voltage signal from an external device against a predetermined voltage threshold;
    monitoring an electrical current signal from the external device against a predetermined current threshold;
    detecting whether the external device is both present and charging based on a combination of the monitored voltage signal, with respect to the predetermined voltage threshold, and the monitored electric current signal, with respect to the predetermined current signal;
    setting a switch on a primary side of the charging device to an off state when the presence and charging of the external device are not detected, where, when the switch on a primary side of the charging device is set to an off state, the charging device consumes no power;
    detecting when both the charging device is reconnected to an AC voltage and when the external device was previously connected to the charging device; and
    in response to the detecting when both the charging device is reconnected to an AC voltage and when the external device was previously connected to the charging device, controlling and powering switching logic to an on state.

2. The method of claim 1, where the detecting whether the external device is present and charging further comprises:
    detecting whether an output connection switch of the charging device is in an off state; and
    detecting that the external device is not present when the output connection switch is in the off state.

3. The method of claim 1, where the detecting whether the external device is present and charging further comprises:
    detecting that the external device is not present using a proximity detector.

4. The method of claim 1, further comprising:
    charging the external device using the switching logic in the on state; and
    causing the switching logic to consume no power while in the on state.

5. The method of claim 1, further comprising:
    resetting the switch on the primary side to an on state based on user input.

6. A charging device, comprising:
    an alternating current (AC) to direct current (DC) converter, where the AC to DC converter includes a primary side that receives power from an AC power source and a secondary side that provides power to an external device;
    a switch connected between the AC power source and the primary side of the AC to DC converter, the switch including an on state and an off state, wherein, when the switch is set to the off state, the charging device consumes no power; and
    switching logic configured to:
        determine whether an external device is presently connected to the charging device;
        determine whether the external device connected to the charging device is fully charged;
        send a control signal to the switch to set the switch to the off state when the switching logic determines that no external device is presently connected to the charging device;
        send a control signal to the switch to set the switch to the off state when the switching logic determines the external device is fully charged; and
        send a control signal to the switch to set the switch to the on state when the switching logic determines that the charging device is reconnected to the AC power source and when the external device was previously connected to the charging device.

7. The charging device of claim 6, where the switching logic is further configured to:
    determine that the external device is fully charged when less than a predetermined amount of current is being drawn by the charging device.

8. The charging device of claim 6, further comprising:
    another switch configured to transmit a signal indicating that the external device is presently connected to the charging device.

9. The charging device of claim 6, further comprising:
    a proximity sensor configured to transmit a signal indicating that the external device is presently connected to the charging device.

10. A charging device, comprising:
    means for detecting a presence of at least one of an external device or a cord connected to the charging device;
    means for detecting whether the external device is fully charged based on a combination of a monitored voltage signal and a monitored electric current signal;

means for setting a switch between an alternating current (AC) power source and a primary side of an AC to direct current (DC) converter on the charging device to an off state when:
  a presence of the at least one of the external device or the cord is not detected, or
  the external device is fully charged, wherein the charging device consumes no power when the switch is set to the off state;
means for detecting both when the charging device is reconnected to an AC voltage and when the external device was previously connected to the charging device; and
means for resetting the switch to an on state when it is detected that the charging device is reconnected to an AC voltage and the external device was previously connected to the charging device.

11. The charging device of claim 10, where the means for detecting a presence of at least one of the external device or the cord comprises another switch.

12. The charging device of claim 11, where the other switch is activated by at least one of the external device, the cord, or an actuator.

13. The charging device of claim 10, where the means for detecting a presence of at least one of the external device or the cord comprises a proximity detector.

* * * * *